United States Patent
Ueno et al.

(10) Patent No.: US 10,364,786 B2
(45) Date of Patent: Jul. 30, 2019

(54) CONTROLLER AND INTERNAL COMBUSTION ENGINE SYSTEM

(71) Applicant: HONDA MOTOR CO., LTD., Tokyo (JP)

(72) Inventors: Masaki Ueno, Wako (JP); Masaaki Nagashima, Wako (JP); Hidekazu Hironobu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 15/371,096

(22) Filed: Dec. 6, 2016

(65) Prior Publication Data

US 2017/0191460 A1 Jul. 6, 2017

(30) Foreign Application Priority Data

Jan. 6, 2016 (JP) ................... 2016-001018

(51) Int. Cl.
*F02P 5/04* (2006.01)
*F02D 23/00* (2006.01)
(Continued)

(52) U.S. Cl.
CPC ............. *F02P 5/045* (2013.01); *F02B 37/10* (2013.01); *F02B 37/14* (2013.01); *F02D 23/00* (2013.01);
(Continued)

(58) Field of Classification Search
CPC ......... F02P 5/045; F02P 5/1504; F02B 37/10; F02B 37/14; F02B 37/02; F02B 2037/122;
(Continued)

(56) References Cited

U.S. PATENT DOCUMENTS

2017/0184038 A1* 6/2017 Garrard ............... F02D 41/0007

FOREIGN PATENT DOCUMENTS

| JP | 63-254256 | 10/1988 |
|---|---|---|
| JP | 05-256157 | 10/1993 |

(Continued)

OTHER PUBLICATIONS

Japanese Office Action for corresponding JP Application No. 2016-001018, dated Aug. 22, 2017 (w/ English machine translation).

(Continued)

*Primary Examiner* — Jacob S. Scott
*Assistant Examiner* — Lori Wu
(74) *Attorney, Agent, or Firm* — Mori & Ward, LLP (57) ABSTRACT

A controller for an internal combustion engine includes a regenerative device and at least one of ignition timing circuitry and opening degree circuitry. The ignition timing circuitry is configured to retard an ignition timing so as to decrease a torque generated by the internal combustion engine in a shift-up operation of a multi-stage automatic transmission during a supercharging operation by a supercharger. The opening degree circuitry is configured to reduce an opening degree of a throttle valve so as to decrease a torque generated by the internal combustion engine in a shift-up operation of a multi-stage automatic transmission during a supercharging operation by a supercharger. The regenerative device is coupled to a compressor or a turbine of the supercharger to regenerate rotational energy in the compressor or the turbine so as to decrease the torque in the shift-up operation during the supercharging operation.

13 Claims, 4 Drawing Sheets

(51) Int. Cl.
*F02B 37/14* (2006.01)
*F02B 37/10* (2006.01)
*F02D 41/00* (2006.01)
*F02D 37/02* (2006.01)
*F02D 41/02* (2006.01)
*F02P 5/15* (2006.01)
*F02B 37/12* (2006.01)

(52) U.S. Cl.
CPC ......... *F02D 37/02* (2013.01); *F02D 41/0007* (2013.01); *F02D 41/023* (2013.01); *F02P 5/1504* (2013.01); *F02B 2037/122* (2013.01); *F02D 2200/0406* (2013.01); *F02D 2250/22* (2013.01); *Y02T 10/144* (2013.01); *Y02T 10/46* (2013.01)

(58) Field of Classification Search
CPC .... F02D 41/0007; F02D 41/023; F02D 23/00; F02D 23/02; F02D 2250/22; F02D 2200/0406

See application file for complete search history.

(56) References Cited

FOREIGN PATENT DOCUMENTS

| | | |
|---|---|---|
| JP | 2004-150348 | 5/2004 |
| JP | 2005-009315 | 1/2005 |
| JP | 2006-307787 | 11/2006 |
| JP | 2015-094288 | 5/2015 |

OTHER PUBLICATIONS

Japanese Office Action for corresponding JP Application No. 2016-001018, dated Mar. 27, 2018 (w/ English machine translation).

* cited by examiner

FIG. 4A
BOOST PRESSURE

TARGET (TARGET BOOST PRESSURE)
EXAMPLE (BOOST PRESSURE TBP)
RELATED ART

FIG. 4B
MOTOR OF ELECTRIC TC

ASSISTANCE
REGENERATION

FIG. 4C
IGNITION TIMING

ADVANCE
RETARD
EXAMPLE
RETARDATION LIMIT
RELATED ART

FIG. 4D
ENGINE ROTATIONAL SPEED

ROTATIONAL SPEED AT SHIFT STAGE CURRENTLY USED
ROTATIONAL SPEED AT SHIFT STAGE AFTER SHIFT-UP
t1  t2 t3  TIME

CONTROLLER AND INTERNAL COMBUSTION ENGINE SYSTEM

CROSS-REFERENCE TO RELATED APPLICATIONS

The present application claims priority under 35 U.S.C. § 119 to Japanese Patent Application No. 2016-001018, filed Jan. 6, 2016, entitled "Controller for Internal Combustion Engine." The contents of this application are incorporated herein by reference in their entirety.

BACKGROUND

Technical Field

The present disclosure relates to a controller and an internal combustion engine system.

Discussion of the Background

In the related art, for example, a controller for an internal combustion engine having the above configuration disclosed in Japanese Unexamined Patent Application Publication No. 2015-094288 is known. A compressor and a turbine of the supercharger are rotatably provided in an intake passage and an exhaust passage, respectively, of this internal combustion engine, and the compressor and the turbine are coupled to each other via a rotary shaft. Accordingly, an exhaust gas exhausted to the exhaust passage rotationally drives the turbine, and accordingly, the compressor rotates with the turbine, and a supercharging operation for boosting an intake air is performed. In addition, in this internal combustion engine, one of the intake passage and the exhaust passage is provided with a bypass line that bypasses the compressor or the turbine, and the bypass line is provided with a control valve for opening and closing the passage. The opening and closing of the control valve is controlled in order to control the boost pressure downstream of the compressor in the intake passage.

In a typical internal combustion engine connected to a multi-stage automatic transmission, if the transmission performs shift-up, the rotational speed of the internal combustion engine on the input side of the transmission is decreased to match a rotational speed according to a gear ratio of a shift stage after the shift. In addition, in order to reduce shift shock, a torque-down control is performed in which the torque is temporarily decreased by, for example, retarding the ignition timing. To perform such a torque-down control, in the above-described controller of the related art, the boost pressure is decreased by performing drive control to open a control valve during shift-up in the supercharging operation of the internal combustion engine. In addition, after the shift-up, drive control is performed to close the control valve, thereby increasing the boost pressure that has been decreased once already.

SUMMARY

According to a first aspect of the present invention, a controller for an internal combustion engine including a supercharger and being connected to a multi-stage automatic transmission, the controller includes a first torque suppressor and a second torque suppressor. The first torque suppressor and the second torque suppressor perform a torque-down control to decrease a torque of the internal combustion engine during shift-up by the automatic transmission in a supercharging operation. The first torque suppressor includes at least one of an ignition-timing retarding controller that performs control to retard an ignition timing and a throttle-valve closing controller that performs control to reduce an opening degree of a throttle valve. The second torque suppressor is coupled to a compressor or turbine of the supercharger and including a regenerative device that regenerates rotational energy of the coupled compressor or turbine.

According to a second aspect of the present invention, a controller for an internal combustion engine includes a regenerative device and at least one of ignition timing circuitry and opening degree circuitry. The ignition timing circuitry is configured to retard an ignition timing so as to decrease a torque generated by the internal combustion engine in a shift-up operation of a multi-stage automatic transmission during a supercharging operation by a supercharger. The opening degree circuitry is configured to reduce an opening degree of a throttle valve so as to decrease a torque generated by the internal combustion engine in an shift-up operation of a multi-stage automatic transmission during a supercharging operation by a supercharger. The regenerative device is coupled to a compressor or a turbine of the supercharger to regenerate rotational energy in the compressor or the turbine so as to decrease the torque in the shift-up operation during the supercharging operation.

According to a third aspect of the present invention, an internal combustion engine system includes an internal combustion engine, a supercharger, a multi-stage automatic transmission, at least one of ignition timing circuitry and opening degree circuitry, and a regenerative device. The supercharger includes a compressor and a turbine. The multi-stage automatic transmission is connected to the internal combustion engine. The ignition timing circuitry is configured to retard an ignition timing so as to decrease a torque generated by the internal combustion engine in a shift-up operation of a multi-stage automatic transmission during a supercharging operation by a supercharger. The opening degree circuitry is configured to reduce an opening degree of a throttle valve so as to decrease a torque generated by the internal combustion engine in a shift-up operation of a multi-stage automatic transmission during a supercharging operation by a supercharger. The regenerative device is coupled to a compressor or a turbine of the supercharger to regenerate rotational energy in the compressor or the turbine so as to decrease the torque in the shift-up operation during the supercharging operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
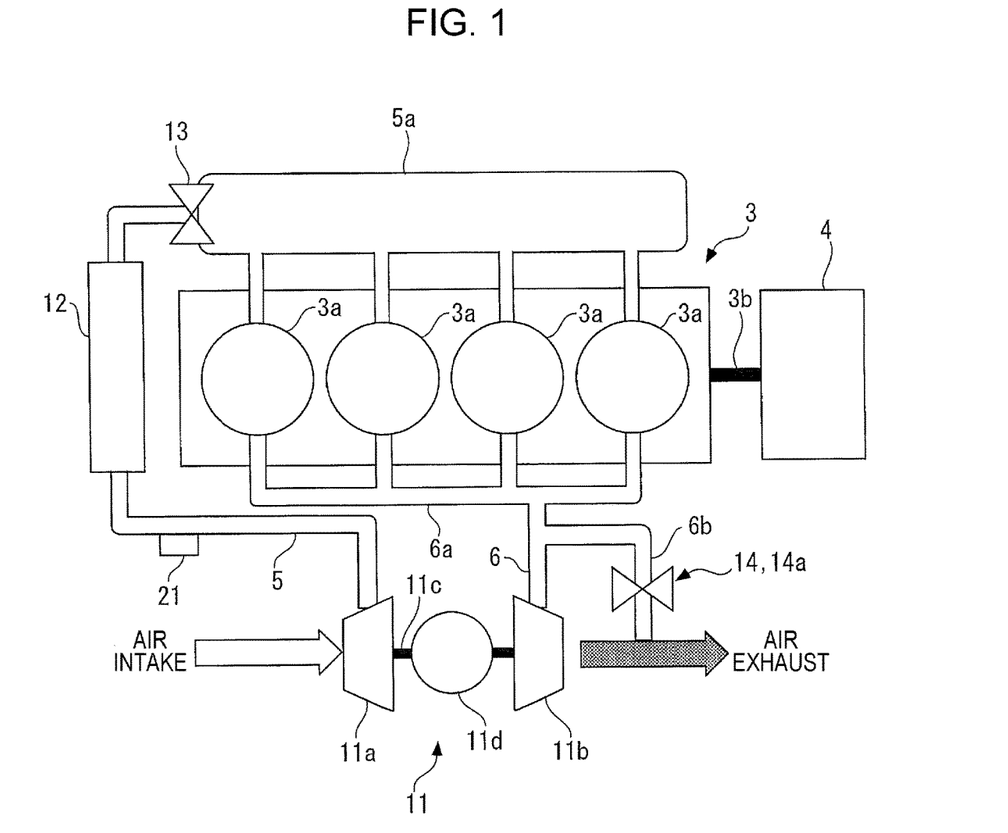
FIG. 1 schematically illustrates a configuration of an internal combustion engine employing a controller according to an embodiment of the present disclosure.
Figure 2:
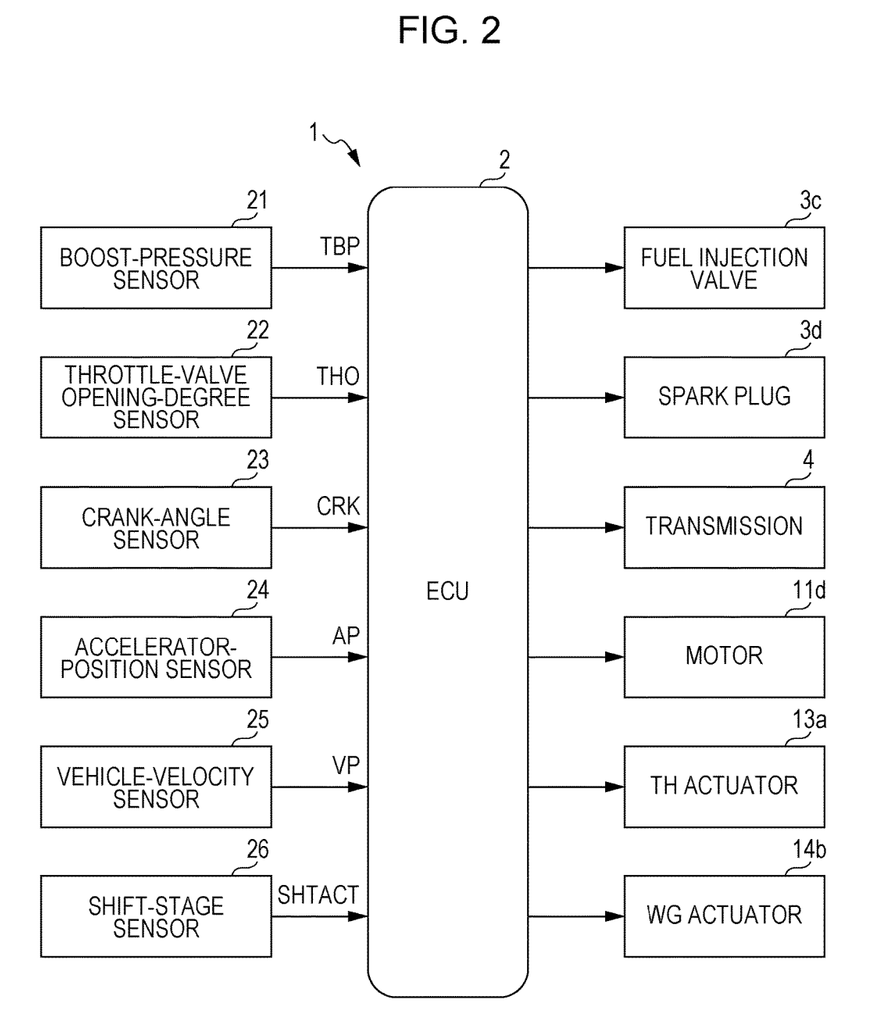
FIG. 2 is a block diagram schematically illustrating a configuration of the controller.

Hereinafter, a preferred embodiment of the present disclosure will be described in detail with reference to the drawings. FIG. 1 schematically illustrates an internal combustion engine 3 employing a controller 1 according to an embodiment of the present disclosure. FIG. 2 schematically illustrates a configuration of the controller 1. The internal combustion engine (hereinafter referred to as an engine) 3 is, for example, an inline-four engine including four cylinders 3a, and the operation of the engine 3 is controlled by an engine control unit (ECU) 2. The engine 3 is installed in a vehicle (not illustrated) and connected to a transmission 4 via a crankshaft 3b serving as an output shaft. In the engine 3, a fuel injection valve 3c and a spark plug 3d are provided for each of the cylinders 3a, and the fuel injection amount of the fuel injection valve 3c and the ignition timing of the spark plug 3d are controlled by the ECU 2.

The cylinders 3a are connected to an intake passage 5 via an intake manifold 5a and to an exhaust passage 6 via an exhaust manifold 6a. In the intake passage 5, a compressor 11a of an electric turbocharger 11 (supercharger, electric supercharger), a boost-pressure sensor 21, an intercooler 12, and a throttle valve 13 are disposed in this order from the upstream side.

The compressor 11a is mechanically coupled to a turbine 11b of the electric turbocharger 11 via a rotary shaft 11c, the turbine 11b being disposed in the exhaust passage 6, and is coupled to a motor 11d (second torque suppressor, regenerative device, electric motor). The compressor 11a rotates with the turbine 11b being rotationally driven by an exhaust gas flowing through the exhaust passage 6, thereby performing a supercharging operation for supercharging of the air (fresh air). In addition, upon operating of the motor 11d by supplying electricity from a battery (not illustrated), the compressor 11a is rotationally driven. Accordingly, not only the supercharging operation by the compressor 11a by using rotation of the turbine 11b is performed, but also the supercharging operation is assisted. Furthermore, the motor 11d has a regenerating function of regenerating the rotational energy of the compressor 11a and converting the energy to electrical energy. The battery is charged with the electrical energy obtained by the conversion.

The boost-pressure sensor 21 detects, as a boost pressure TBP, the pressure downstream of the compressor 11a in the intake passage 5 and outputs the detected signal to the ECU 2. The intercooler 12 cools the air that has been heated by the supercharging operation by the compressor 11a. The throttle valve 13 is formed of a butterfly valve that is provided so as to be capable of rotationally moving in the intake passage 5. The opening degree of the throttle valve 13 is controlled via a throttle (TH) actuator 13a in accordance with a control signal from the ECU 2. Thus, the amount of air flowing through the throttle valve 13 is controlled.

The exhaust passage 6 includes a bypass line 6b that bypasses the turbine 11b of the electric turbocharger 11. The bypass line 6b includes a wastegate 14. The wastegate 14 includes a wastegate valve 14a that can be opened or closed, and the opening degree is controlled via a wastegate (WG) actuator 14b in accordance with a control signal from the ECU 2. Thus, the flow rate of the exhaust gas toward the turbine 11b is adjusted, whereby the boost pressure TBP is controlled.

A throttle-valve opening degree THO is detected by a throttle-valve opening-degree sensor 22, and the detected signal is output to the ECU 2. The engine 3 further includes a crank-angle sensor 23. Upon rotation of the crankshaft 3b, the crank-angle sensor 23 outputs a crank (CRK) signal, which is a pulsed signal, to the ECU 2 for each predetermined crank angle. On the basis of the CRK signal, the ECU 2 calculates a rotational speed (hereinafter referred to as an engine rotational speed) NE of the engine 3. In addition, an accelerator-position sensor 24 outputs, to the ECU 2, a detected signal indicative of the amount AP by which the acceleration pedal (not illustrated) of the vehicle is depressed (hereinafter referred to as an accelerator position), and a vehicle-velocity sensor 25 outputs, to the ECU 2, a detected signal indicative of a vehicle velocity VP.

The transmission 4 connected to the engine 3 is a dual-clutch-type multi-stage automatic transmission and is configured to set a shift stage among a plurality of shift stages while switching by using two clutches between two input systems that supply power to the engine 3. The operation of the transmission 4 including the switching using these clutches and the setting of the shift stage is controlled by the ECU 2.

Because of the mechanism of the transmission 4, during shift by the transmission 4, it is necessary that the engine rotational speed NE on the input side match the rotational speed according to a gear ratio of a shift stage after the shift. Accordingly, under control of the ECU 2, a torque-down control for decreasing the torque of the engine 3 is performed during shift-up, whereas a torque-up control for increasing the torque of the engine 3 is performed during shift-down. In addition, the transmission 4 is provided with a shift-stage sensor 26 that detects an actual shift stage SHTACT, which is currently set. The detected signal is output to the ECU 2.

The ECU 2 is formed of a microcomputer including a central processing unit (CPU), a random-access memory (RAM), a read-only memory (ROM), an input/output (I/O) interface (all of which are not illustrated), and the like. The ECU 2 determines operation states of the engine 3, the transmission 4, and the electric turbocharger 11 on the basis of the detected signals and the like obtained by the above-described boost-pressure sensor 21, throttle-valve opening-degree sensor, crank-angle sensor 23, accelerator-position sensor 24, vehicle-velocity sensor 25, and shift-stage sensor 26. Depending on the determined operation states, the ECU 2 performs various controls on the engine 3, the transmission 4, and the electric turbocharger 11 in accordance with programs stored in the ROM. Note that in the embodiment, the ECU 2 corresponds to a first torque suppressor, an ignition-timing retarding controller, and a throttle-valve closing controller according to an embodiment of the present disclosure.

Figure 3:
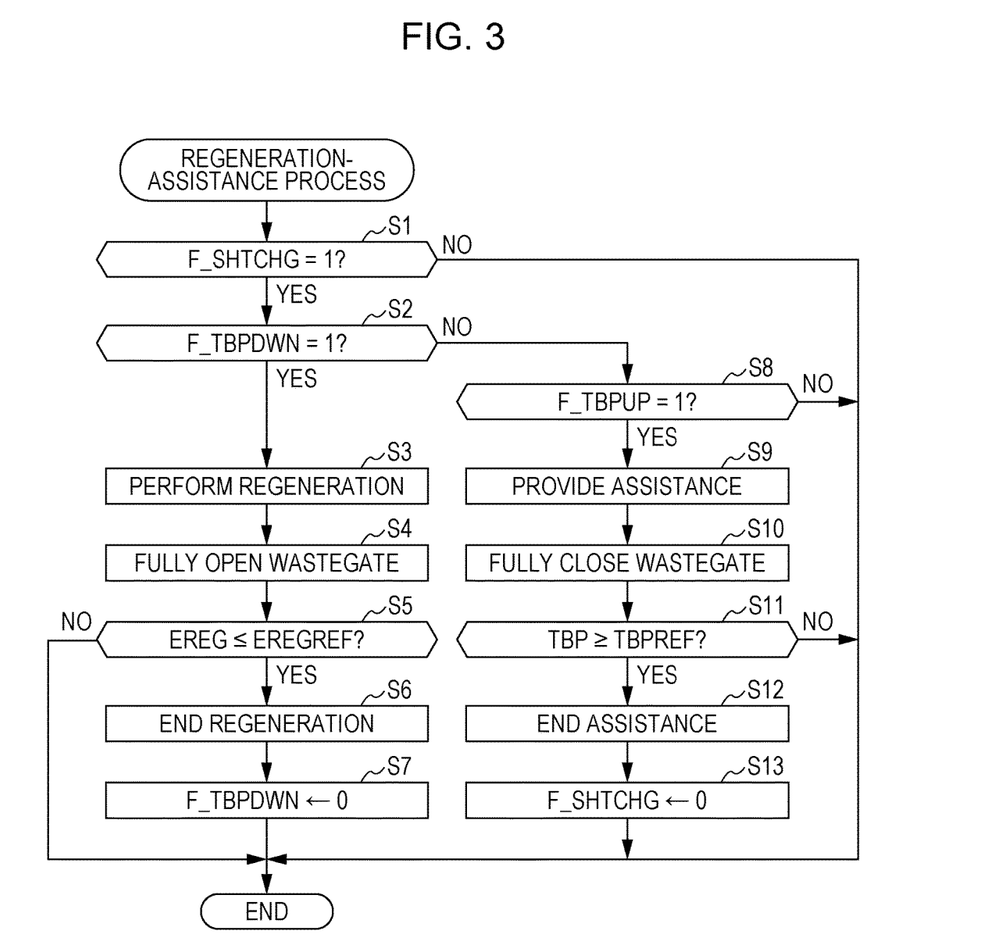
FIG. 3 is a flowchart illustrating a regeneration-assistance process.

FIG. 3 illustrates a regeneration-assistance process for the electric turbocharger 11 performed by the ECU 2. In this regeneration-assistance process, during shift-up by the transmission 4 in the supercharging operation by the engine 3, the motor 11d of the electric turbocharger 11 performs regeneration, and after the shift-up, the motor 11d rotationally drives the compressor 11a, thereby assisting the supercharging operation. Note that this process is repeatedly performed in a predetermined cycle.

In this process, first, in step 1 (represented as "S1", and the other steps are represented in the same manner), it is determined whether or not a shift execution flag F_SHTCHG is "1". Depending on the engine rotational speed NE, the accelerator position AP, the vehicle velocity VP, the actual shift stage SHTACT, and the like, if the actual shift stage SHTACT, which is the current shift stage of the transmission 4, is to be changed to another shift stage, the shift execution flag F_SHTCHG is set to "1" to execute shift. If the determination result in step 1 is NO, this process ends because there is no need for executing shift. On the other hand, if the determination result in step 1 is YES, the process proceeds to step 2 where it is determined whether or not a boost-pressure decrease-request flag F_TBPDWN is "1".

The boost-pressure decrease-request flag F_TBPDWN is set to "1" if the boost pressure TBP is to be decreased in order to perform a torque-down control for decreasing the torque of the engine 3 during shift-up by the transmission 4. If the determination result in step 2 is YES, the motor 11d of the electric turbocharger 11 performs regeneration (step 3), and in addition, the wastegate 14 is controlled to be fully open (step 4).

By the wastegate 14 being controlled to be fully open in this manner, most of the exhaust gas that has been exhausted to the exhaust passage 6 flows into the bypass line 6b, and the exhaust gas flowing toward the turbine 11b is reduced. Accordingly, rotation of the compressor 11a that rotates with the turbine 11b is suppressed, resulting in a decrease in the boost pressure TBP. In addition, the rotational energy of the compressor 11a is regenerated by the motor 11d of the electric turbocharger 11, and the battery is charged with the consequently generated electrical energy. In this case, rotational resistance generated by the motor 11d acts on the compressor 11a, thereby suppressing rotation of the compressor 11a. By the wastegate 14 being controlled to be fully open and the motor 11d performing regeneration in the above manner, it is possible to quickly decrease the boost pressure TBP.

Then, in step 5, it is determined whether or not a regenerated current EREG is less than or equal to a predetermined value EREGREF. As the predetermined value EREGREF, a value of the current at which, for example, the charging by using regeneration by the motor 11d becomes not possible any more is set. Accordingly, if the determination result in step 5 is NO, i.e., if EREG>EREGREF is satisfied, this process ends, and the regeneration by the motor 11d is continued. On the other hand, if the determination result in step 5 is YES, the regeneration ends (step 6) because the charging by using regeneration by the motor 11d is not possible, and in addition, a boost-pressure decrease-request flag F_TBPDWN is reset to "0" (step 7), whereby the process ends. The execution of step 7 results in NO as the determination result in step 2. In this case, the process proceeds to step 8 where it is determined whether or not a boost-pressure increase-request flag F_TBPUP is "1".

The boost-pressure increase-request flag F_TBPUP is set to "1" if the boost pressure TBP is to be increased in response to the acceleration request that has been issued by depression of the acceleration pedal after the shift-up by the transmission 4. If the determination result in step 8 is NO, this process ends. On the other hand, if the determination result in step 8 is YES, the motor 11d of the electric turbocharger 11 assists the supercharging operation (step 9), and in addition, the wastegate 14 is controlled to be fully closed (step 10).

As described above, by the wastegate 14 being controlled to be fully closed, all the exhaust gas that has been exhausted to the exhaust passage 6 flows toward the turbine 11b. Accordingly, rotation of the compressor 11a that rotates with the turbine 11b is increased, resulting in an increase in the boost pressure TBP. In addition, by the motor 11d rotationally driving the compressor 11a, the supercharging operation is assisted. By the wastegate 14 being controlled to be fully closed and the motor 11d providing assistance in the above manner, it is possible to quickly increase the boost pressure TBP.

Then, in step 11, it is determined whether or not the boost pressure TBP is greater than or equal to a predetermined value TBPREF. As the predetermined value TBPREF, a value at which, for example, a sufficient boost pressure TBP is obtained by rotation of the compressor 11a is set. Accordingly, if the determination result in step 11 is NO, i.e., TBP<TBPREF is satisfied, this process ends, and the assistance by the motor 11d is continued. On the other hand, if the determination result in step 11 is YES, because the boost pressure TBP is sufficiently high, the assistance by the motor 11d ends (step 12), and in addition, the shift execution flag F_SHTCHG is reset to "0" (step 13), whereby this process ends. Note that the execution of step 13 results in NO as the determination result in step 1. Accordingly, in this regeneration-assistance process, the motor 11d of the electric turbocharger 11 will not perform regeneration nor provide assistance until shift-up is performed.

Figure 4A:
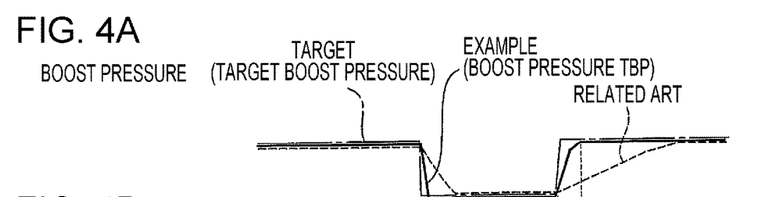
FIGS. 4A to 4D are a timing chart illustrating an exemplary operation obtained by the regeneration-assistance process.

Next, referring to FIG. 4, an exemplary operation obtained by the above-described regeneration-assistance process will be described. In this example, the shift-up by the transmission 4 is performed during the supercharging operation by the engine 3. As illustrated in FIG. 4A, at time t1 corresponding to the initiation of the shift-up by the transmission 4, a target value of the boost pressure (hereinafter referred to as a target boost pressure) is changed to a lower value. Then, at time t2 corresponding to the end of the shift-up, the target boost pressure is changed to a higher value, which is the original value. In this case, the electric turbocharger 11 and the wastegate 14 are controlled in such a manner that the boost pressure TBP according to this embodiment becomes the above-described target boost pressures.

Figure 4B:
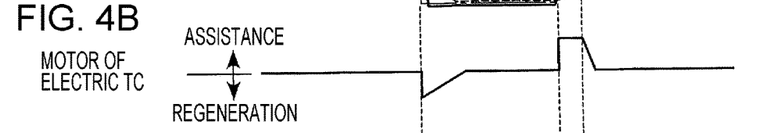

Specifically, as illustrated in FIG. 4B, at time t1, the motor 11d of the electric turbocharger 11 performs regeneration (step 3), and in addition, the wastegate 14 is controlled to be fully open (step 4). Accordingly, as illustrated in FIG. 4A, in this example, the boost pressure TBP is rapidly dropped and controlled to quickly become the lower target boost pressure. In this case, in addition, as illustrated in FIG. 4C, the ignition timing is controlled to be temporarily retarded.

In the above manner, the above-described torque-down control is performed by the quick decrease in the boost pressure TBP by using regeneration by the motor 11d and retardation of the ignition timing. Accordingly, as illustrated in FIG. 4D, the engine rotational speed NE is decreased (from time t1 to time t2).

Then, the shift-up ends, and as illustrated in FIG. 4A, if the target boost pressure is changed to the original higher value (time t2), the motor 11d of the electric turbocharger 11 provides assistance (step 9), and in addition, the wastegate 14 is controlled to be fully closed (step 10). Accordingly, as illustrated in FIG. 4A, in this example, the boost pressure TBP rapidly rises and controlled to quickly become the higher target boost pressure. In this case, the motor 11d continues to assist the supercharging operation at a fixed predetermined power from the battery until the boost pressure TBP reaches the target boost pressure. Upon the boost pressure TBP reaching the target boost pressure (at and after time t3), power supply to the motor 11d is gradually decreased and then stopped.

In the above manner, the quick increase in the boost pressure TBP as a result of assistance by the motor 11d enables quick performing of a torque-up control after the torque-down control. Accordingly, as illustrated in FIG. 4D, the engine rotational speed NE after the shift-up is quickly increased (at and after time t2), thereby enhancing acceleration responsiveness.

Figures 4C, 4D:
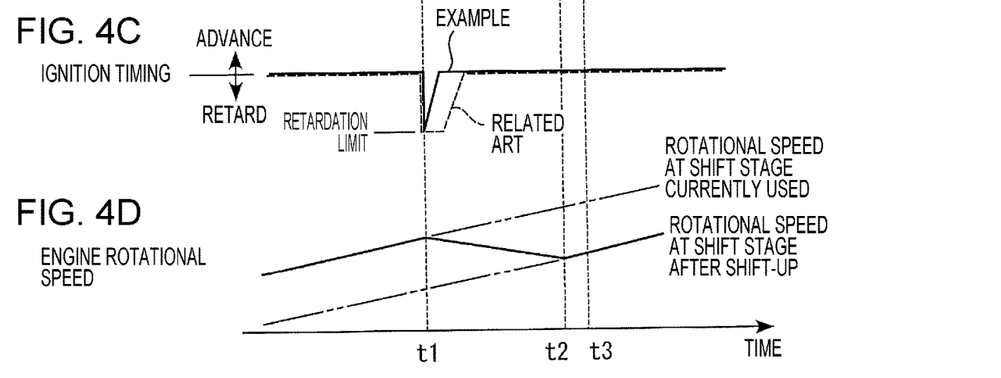

Note that broken lines in FIGS. 4A and 4C indicate a boost pressure and an ignition timing of the related art. The related art is different from the example of the embodiment in only a supercharger, using a typical turbocharger without a motor. As illustrated in FIG. 4A, the rise and drop in the boost pressure in the related art are slower than those in the boost pressure TBP in this example. Accordingly, if a torque-down control is performed in the related art, as illustrated in FIG. 4C, it is necessary to continue retardation of the ignition timing at the retardation limit for a longer period than in this example, thereby decreasing combustion efficiency.

As specifically described above, according to the embodiment, during shift-up by the transmission 4 in a supercharging operation, it is possible to appropriately perform a torque-down control of the engine 3 by retardation of the ignition timing and by using regeneration by the motor 11d of the electric turbocharger 11. In addition, because it is possible to quickly decrease the boost pressure TBP by using regeneration by the motor 11d, retardation of the ignition timing during the torque-down control is shortened compared with the related art, and accordingly, it is possible to increase the combustion efficiency of the internal combustion engine 3.

In addition, the battery can be charged with electrical energy generated by the above-described regeneration. Furthermore, after the shift-up, by rotationally driving the compressor 11a by using the motor 11d to assist a supercharging operation, it is possible to quickly increase the boost pressure TBP that has been decreased once already, thereby enhancing acceleration responsiveness.

Note that the present disclosure is not limited to the above-described embodiment and can be implemented in various modes. For example, although the embodiment has illustrated only the case where the ignition timing is retarded by the first torque suppressor according to an embodiment of the present disclosure for performing a torque-down control, control by the first torque suppressor according to the embodiment of the present disclosure is not limited thereto. In addition to or in place of the above retardation, the first torque suppressor may perform control to reduce the opening degree of the throttle valve 13 (throttle-valve opening degree THO) during the torque-down control. In addition, although the embodiment has illustrated the motor 11d coupled to the compressor 11a of the electric turbocharger 11, instead of this configuration, the motor 11d may be coupled to the turbine 11b and may regenerate the rotational energy of the turbine 11b.

Furthermore, although the embodiment has illustrated a dual-clutch-type transmission as an example of the transmission 4, another type of multi-stage automatic transmission may be employed. In addition, specific configurations of the embodiment may appropriately be modified without departing from the spirit of the present disclosure.

According to a first aspect of the present disclosure, a controller for an internal combustion engine 3 including a supercharger (electric turbocharger 11 in the embodiment (the same applies to other components)) and being connected to a multi-stage automatic transmission (transmission 4) includes a first torque suppressor and a second torque suppressor (ECU 2) that perform a torque-down control to decrease a torque of the internal combustion engine 3 during shift-up by the automatic transmission in a supercharging operation, the first torque suppressor including at least one of an ignition-timing retarding controller (ECU 2) that performs control to retard an ignition timing and a throttle-valve closing controller (ECU 2) that performs control to reduce an opening degree of a throttle valve 13, the second torque suppressor being coupled to a compressor 11a or turbine 11b of the supercharger and including a regenerative device (motor 11d) that regenerates rotational energy of the coupled compressor 11a or turbine 11b.

With this configuration, a torque-down control is performed in which the torque of the internal combustion engine is decreased by the first and second torque suppressors during shift-up by the multi-stage automatic transmission in the supercharging operation. This torque-down control is performed during shift-up by the automatic transmission in order to decrease the rotational speed of the internal combustion engine to match a rotational speed according to a gear ratio of a shift stage after the shift and to reduce shift shock.

The above-described first torque suppressor includes at least one of the ignition-timing retarding controller and the throttle-valve closing controller, the ignition-timing retarding controller performing control to retard the ignition timing, the throttle-valve closing controller performing control to reduce the opening degree of the throttle valve, in order to decrease the torque of the internal combustion engine. The second torque suppressor includes the regenerative device coupled to the compressor or turbine of the supercharger, and the regenerative device regenerates the rotational energy of the coupled compressor or turbine. In this case, rotational resistance acts on the compressor directly from the regenerative device or via the turbine coupled to the regenerative device, thereby suppressing rotation of the compressor. Note that a typical internal combustion engine including a supercharger includes a device (e.g., wastegate) for adjusting the boost pressure. Accordingly, in addition to the control performed by such a device so as to decrease the boost pressure, with the regeneration control performed by the regenerative device, it is possible to decrease the boost pressure more quickly than in the related art.

As described above, by using the first and second torque suppressors, it is possible to appropriately perform the torque-down control. In particular, if the ignition-timing retarding controller is used as the first torque suppressor, the regenerative device of the second torque suppressor quickly decreases the boost pressure, shortening the retardation period for the ignition timing compared with the related art, and accordingly, it is possible to increase the combustion efficiency of the internal combustion engine.

According to a second aspect of the present disclosure, in the controller for the internal combustion engine according to the first aspect, the supercharger may include an electric supercharger (electric turbocharger) that rotationally drives the compressor 11a by using an electric motor (motor 11d), and the regenerative device may include the electric motor (motor 11d) having a regenerating function.

With this configuration, the supercharger includes the electric supercharger that rotationally drives the compressor by using the motor. In addition, the motor of the electric supercharger has a regenerating function to serve as the regenerative device of the second torque suppressor. Accordingly, also by using the motor, it is possible to rotate the compressor that rotates with rotation of the turbine. In addition, it is possible to charge a battery with electrical energy generated by using the regenerating function of the motor.

According to a third aspect of the present disclosure, in the controller for the internal combustion engine according to the second aspect, after the shift-up by the automatic transmission (transmission 4), the electric motor (motor 11d)

may rotationally drive the compressor 11a to assist the supercharging operation by the compressor 11a.

With this configuration, the motor of the electric supercharger rotationally drives the compressor after the shift-up by the automatic transmission, thereby assisting the supercharging operation by the compressor. Accordingly, it is possible to quickly increase the boost pressure, thereby enhancing acceleration responsiveness.

Obviously, numerous modifications and variations of the present invention are possible in light of the above teachings. It is therefore to be understood that within the scope of the appended claims, the invention may be practiced otherwise than as specifically described herein.

What is claimed is:

1. A controller for an internal combustion engine including a supercharger and being connected to a multi-stage automatic transmission, the controller comprising:
   a first torque suppressor and a second torque suppressor that perform a torque-down control to decrease a torque of the internal combustion engine during shift-up by the automatic transmission in a supercharging operation,
   the first torque suppressor including at least one of an ignition-timing retarding controller that performs control to retard an ignition timing and a throttle-valve closing controller that performs control to reduce an opening degree of a throttle valve,
   the second torque suppressor being coupled to a compressor or turbine of the supercharger and including a regenerative device that regenerates rotational energy of the coupled compressor or turbine.

2. The controller according to claim 1, wherein
   the supercharger includes an electric supercharger that rotationally drives the compressor by using an electric motor, and
   the regenerative device includes the electric motor having a regenerating function.

3. The controller according to claim 2, wherein
   after the shift-up by the automatic transmission, the electric motor rotationally drives the compressor to assist the supercharging operation by the compressor.

4. The controller according to claim 1, wherein the first torque suppressor includes both the ignition-timing retarding controller and the throttle-valve closing controller.

5. The controller according to claim 1,
   wherein the regenerative device terminates regeneration of the rotational energy before termination of the shift-up by the automatic transmission, and
   wherein the first torque suppressor terminates the torque-down control before termination of the regeneration.

6. A controller for an internal combustion engine, comprising:
   at least one of ignition timing circuitry configured to retard an ignition timing and opening degree circuitry configured to reduce an opening degree of a throttle valve so as to decrease a torque generated by the internal combustion engine in a shift-up operation of a multi-stage automatic transmission during a supercharging operation by a supercharger; and
   a regenerative device coupled to a compressor or a turbine of the supercharger to regenerate rotational energy in the compressor or the turbine so as to decrease the torque in the shift-up operation during the supercharging operation.

7. The controller according to claim 6, wherein
   the supercharger includes an electric supercharger that rotationally drives the compressor with an electric motor, and
   the regenerative device includes the electric motor having a regenerating function.

8. The controller according to claim 7, wherein
   after the shift-up by the automatic transmission, the electric motor rotationally drives the compressor to assist the supercharging operation by the compressor.

9. The controller according to claim 6, wherein both the ignition timing circuitry and the opening degree circuitry are provided.

10. The controller according to claim 6,
    wherein the regenerative device terminates regeneration of the rotational energy before termination of the shift-up operation of the multi-stage automatic transmission during the supercharging operation, and
    wherein the at least one of ignition timing circuitry and the opening degree circuitry stops decreasing the torque in the shift-up operation during the supercharging operation before termination of the regeneration.

11. An internal combustion engine system comprising:
    an internal combustion engine;
    a supercharger including a compressor and a turbine;
    a multi-stage automatic transmission connected to the internal combustion engine;
    at least one of ignition timing circuitry configured to retard an ignition timing and opening degree circuitry configured to reduce an opening degree of a throttle valve so as to decrease a torque generated by the internal combustion engine in a shift-up operation of a multi-stage automatic transmission during a supercharging operation by a supercharger; and
    a regenerative device coupled to a compressor or a turbine of the supercharger to regenerate rotational energy in the compressor or the turbine so as to decrease the torque in the shift-up operation during the supercharging operation.

12. The internal combustion engine according to claim 11, wherein both the ignition timing circuitry and the opening degree circuitry are provided.

13. The internal combustion engine according to claim 11,
    wherein the regenerative device terminates regeneration of the rotational energy before termination of the shift-up operation of the multi-stage automatic transmission during the supercharging operation, and
    wherein the at least one of ignition timing circuitry and the opening degree circuitry stops decreasing the torque in the shift-up operation during the supercharging operation before termination of the regeneration.

* * * * *